July 4, 1950 H. B. MARTIN ET AL 2,513,809

CURRENT AMPLITUDE LIMITER

Filed March 27, 1947

FIG. 2 (FOR PRIOR ART CIRCUIT)

FIG. 3 (FOR NEW CIRCUIT OF FIG. 1)

INVENTOR.
Karl L. Neumann &
Herschel B. Martin
BY
H. S. Grover
ATTORNEY

Patented July 4, 1950 2,513,809

UNITED STATES PATENT OFFICE 2,513,809

CURRENT AMPLITUDE LIMITER

Herschel B. Martin, Woodside, and Karl L. Neumann, Yonkers, N. Y., assignors to Radio Corporation of America, a corporation of Delaware Application March 27, 1947, Serial No. 737,668

7 Claims. (Cl. 178—44)

In this application, we disclose improved means for limiting the amplitude of currents such as might be used for modulation or other signalling purposes. The current amplitude limiter of the present invention has various uses in the radio and allied arts. It is especially useful for limiting modulation currents such as are used to modulate radio waves, and in particular, very high frequency radio waves.

Our invention has as its general object provision of an improved but simple current amplitude limiter.

In describing our invention in detail, reference will be made to the attached drawings, wherein:

Figs. 2 and 3 illustrate by curves, respectively, the characteristics of a known current amplitude limiter and of our limiter, thereby showing the improvement attained by the use of our limiter.

In radio transmitters, it is highly desirable that the audio frequency produced by the microphone be limited in maximum intensity, in order that over-modulation will not occur. This is true for amplitude modulation equipment, insofar as over-modulation causes what is called side-band splatters. In the case of frequency or phase modulation, the effect of over-modulation is to cause a phase or frequency deviation greater than desired.

A known current amplitude limiter operating on modulation potentials used with carrier currents in the 30 to 40 megacycle band has a characteristic as shown in Fig. 2, wherein the modulation input volts to the current amplitude limiter are plotted against the limiter output voltage. By the expression limiter, applicants mean the apparatus used to amplify and limit the modulation currents. Inspection of this curve of Fig. 2 will show that when the input volts to the limiter passes a critical value, the output voltage not only stops increasing but falls sharply. Thus, if in these known systems, limiting is set to take place starting at an input of about .09 volt, the output modulation voltage will not only be limited for all higher input voltages but will actually be attenuated, and maximum modulation will not occur at the maximum modulation magnitudes. Although over-modulation is prevented, it is not efficient to operate on a modulation amplifier characteristic which falls off in this manner. On the contrary, it is desired to operate at maximum or 100% modulation over a large range of input voltages, starting at the point where maximum modulation occurs and limiting is to take place.

The object of our invention is to provide a simple limiter wherein the limiting action is about constant over a wider range of modulation voltages. An embodiment of our invention is shown in Fig. 1.

Figure 1:
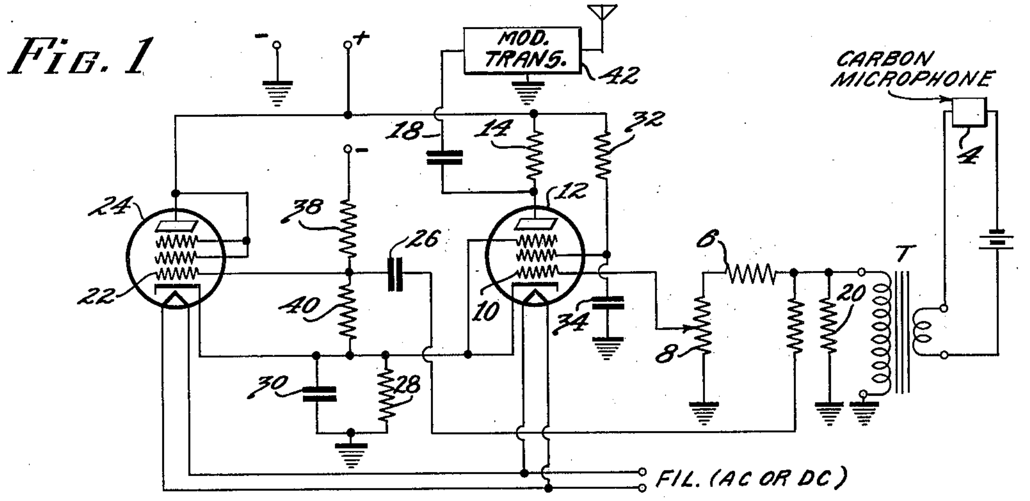
Fig. 1 illustrates by circuit element and circuit element connection, the essential parts of a current amplitude limiter arranged in accordance with our invention.
Figure 1:
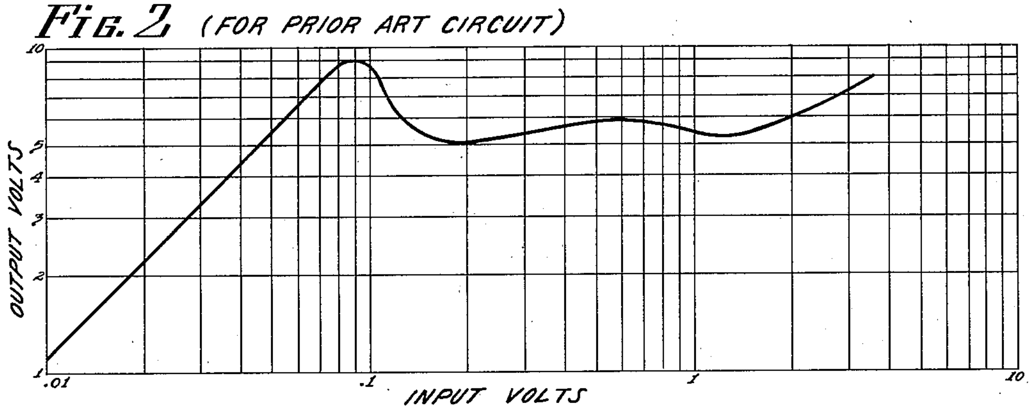
Figure 1:
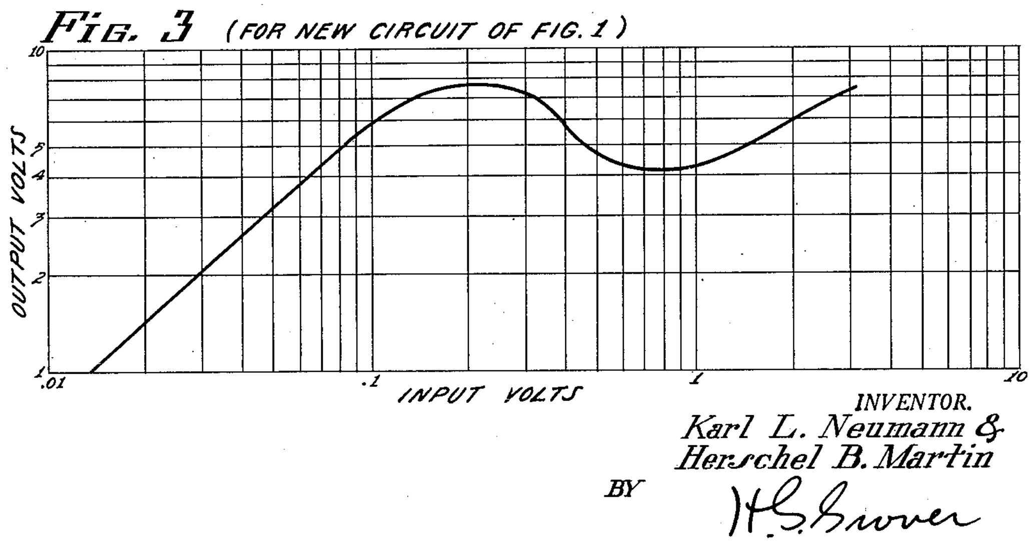

In Fig. 1, 4 represents a microphone such as might be applied to feed modulation voltages such as represent voice signals to a transformer T and from the transformer T by way of a voltage dropping resistor 6 and a potentiometer 8 to the control grid of a modulation amplifier tube 12 having its anode coupled by a resistor 14 to a direct current potential source and to an output lead 18 including a direct current blocking condenser. Potentiometer 8 permits adjustment of the input voltage as desired to start the limiting action for the selected magnitude of signal input voltage. The transformer T is shunted by a resistor 20. 20 is a secondary loading resistor for T to improve the frequency response of T. Its value depends upon the type of transformer used. The transformer T is also connected to the control grid 22 of an auxiliary tube 24 whereby the limiting action is carried out. A coupling and blocking condenser 26 is included in this connection. The cathodes of both tubes are tied together and connected to ground through a resistor 28 shunted by a condenser 30. The suppressor grid of the tube 12 is connected to its cathode and this tube is in pentode operation with the screen grid maintained at a relatively low potential by a large resistor 32. The direct current source and this resistor are bypassed to ground by capacitor 34. The tube 24 has its two auxiliary grids tied to its anode so that this tube operates as a triode. Its control grid is biased relatively highly negative by a connection including resistor 38 and this resistor is connected to ground by way of resistor 40 and the aforementioned common cathode resistor 28, these connections being made to prevent the positive potential appearing across resistor 28 from acting as increased bias on tube 24. The cathodes may be directly heated, but are indirectly heated by filaments connected to a source, not shown.

It will be noted that the current in tube 12 when conductive, is very small, this being the result of this tube's pentode connections and of the large screen grid potential dropping resistor 32. Moreover, the current in this pentode is nearly constant and voltage variations in the resistor 28 resulting from the modulation amplification in this tube 12 are very small as compared to the current and voltage variations in the resistor 28 due to current flow in the triode connected tube 24 when driven out of the cut-off region by the signals which exceed a selected magnitude. In one embodiment, tubes 12 and 24 were a type 6AK6 and the circuit elements had the following values: potentiometer 8=250,000 ohms. Resistor 14=100,000 ohms. Resistor 28=1,500 ohms. Resistor 32=2 megohms. Resistor 38=3 megohms. Resistor 40=2 megohms. Condenser 30=100 microfarads and the potential applied to resistor 38=−50 volts D. C. and the potential applied to resistor 14=+250 volts D. C.

In operation, tube 24 is biased to cut off by the high negative potential on its control grid 22, for modulation potentials of a magnitude less than a selected value, in the example given, about .09 volt. When the modulation magnitude exceeds this value, tube 24 is highly conductive and a heavy current flows in this tube and in resistor 28 and this swings the cathode potentials of both tubes more positive. The increased positive potentials on the cathode of tube 12 however, have the same effect as the application of more negative potentials to the grid of this tube. This reduces the output of tube 12. This tube, however, has a remote cut-off point and is not driven to cut-off and its modulation output is linear as shown in Fig. 3 for a wide range of input voltages which exceed the value at which limiting is to start.

By using a capacitor at 30 which is large enough to bypass lower audio frequencies, degeneration is prevented. That is, the limiting action is delayed to the extent necessary to prevent limiting from taking place at the modulation frequency. An advantage resulting from this is that if high level modulations are being applied and there are stops as between words, the capacitor 30 stores up sufficient charge to prevent the cathode potentials from falling during these intervals. The limiting action then continues when the modulation continues. Our improved circuit of Fig. 1 has a time constant approximately three times faster than the prior art circuits referred to above and accomplishes the desired result with fewer parts.

The limited modulation may be used as desired, for example, to modulate a transmitter 42 which may be of the amplitude modulation, frequency modulation or phase modulation type.

What is claimed is:

1. In a current amplitude limiter, a source of signal current the amplitude of which is to be limited, a pair of electron discharge devices each having input electrodes including a grid and cathode coupled to said source, one of said devices having its grid connected to said source to receive said signal and having output electrodes coupled to an external output circuit to apply the output of said one device thereto, a source of direct potential, a circuit connecting the internal impedances of both of said devices to said source of direct potential including a common resistor connecting the cathodes of both of said devices to the negative terminal of said source, and a connection between the grid of said one device and the end of said resistor remote from the cathodes of said devices.

2. In a current amplitude limiter, a source of current the amplitude of which is to be limited, a pair of electron discharge devices each having input electrodes including a grid and cathode coupled to said source, one of said devices having its grid connected to said source to receive said signal and having output electrodes coupled to an external output circuit to apply the output of said one device thereto, a source of direct potential, a circuit connecting the internal impedances of both of said devices to said source of direct potential including a common desistor connecting the cathodes of both of said devices to the negative terminal of said source, means for maintaining the current flow through said one of said devices small relative to the current flow through the other of said devices when they are conductive, and a connection between the grid of said one device and the end of said resistor remote from the cathodes of said devices.

3. In a current amplitude limiter, a source of current the amplitude of which is to be limited, a pair of electron discharge devices each having input electrodes including a grid and cathode coupled to said source, one of said devices having its grid connected to said source to receive said signal and having output electrodes coupled to an external output circuit to apply the output of said one device thereto, a source of direct potential, a circuit connecting the internal impedances of both of said devices to said source of direct potential including a common resistor connecting the cathodes of both of said devices to the negative terminal of said source, a connection between the grid of said one device and the end of said resistor remote from the cathodes of said devices, and means for applying a negative potential to the grid of the other device.

4. In a current amplitude limiter, a source of currents of signal frequency, a pair of electron discharge devices each having input electrodes including a grid and a cathode coupled to said source, one of said devices having its grid connected to said source to receive said signal and having output electrodes coupled to an external output circuit to apply the output of said one device thereto, a source of direct potential in direct current circuits connecting the internal impedances of both of said devices with said source of direct potential, a resistor common to said last circuits between the cathodes of both of said devices and the negative terminal of said direct potential source, means for operating said one of said devices in such a manner that current flow therethrough is substantially constant for various input levels when the device is conductive, and means for operating the other device in such a manner that the current therethrough varies with variations in the applied signal current magnitude when said other device is conductive.

5. In a current amplitude limiter, a source of currents of signal frequency, a pair of electron discharge devices each having input electrodes including a grid and a cathode coupled to said source, one of said devices being a pentode and having its said grid connected to said source to receive said signal and having output electrodes coupled to an external output circuit to apply the output of said one device thereto, a source of direct potential in direct current circuits connecting the internal impedances of both of said devices with said source of direct potential, a resistor common to said last circuits between the cathodes of both of said devices and the negative terminal of said direct potential source, means for operating said one of said devices as a pentode, means for operating the other device as a triode biased to cut off in the absence of signal currents on the input electrodes thereof, and a bypassing condenser in shunt to said resistor of a magnitude such as to bypass voltages of a frequency higher than the lowest signal frequency.

6. In a current amplitude limiter, a source of currents of audible frequency, a pair of electron discharge devices each having input electrodes including a grid and a cathode coupled to said source, one of said devices being a pentode and having its said grid connected to said source to receive said signal and having output electrodes coupled to an external output circuit to apply the output of said one device thereto, a source of direct potential in direct current circuits connecting the internal impedances of both of said devices with said source of direct potential, a resistor common to said last circuits between the cathodes of both of said devices and the negative terminal of said direct potential source, means for operating said one of said devices as a pentode including two auxiliary electrodes one operating at cathode potential, the other operating at a positive potential relative to the cathode, means for operating the other device as a triode biased to cut off in the absence of currents on the input electrodes thereof, and a bypassing condenser in shunt to said resistor of a magnitude such as to bypass voltages of a frequency higher than the lowest audible frequency.

7. In a current amplitude limiter, an electron discharge amplifier device having a cathode, a control element and an output electrode, a cathode follower stage electron discharge device having a cathode and a control electrode, a source of direct potential, a circuit connecting the internal impedances of both of said devices to said source including a common resistor connecting the cathodes of both of said devices to the negative terminal of said source, and a single signal source connected to said control element of said amplifier device and to said control electrode of said follower device to feed signals in phase to both of said devices.

HERSCHEL B. MARTIN.
KARL L. NEUMANN.

REFERENCES CITED

The following references are of record in the file of this patent:

UNITED STATES PATENTS

| Number | Name | Date |
|---|---|---|
| 2,147,940 | Toennies | Feb. 21, 1939 |
| 2,276,565 | Crosby | Mar. 17, 1942 |
| 2,305,842 | Case | Dec. 22, 1942 |